(12) United States Patent
Pearl et al.

(10) Patent No.: US 11,008,504 B1
(45) Date of Patent: May 18, 2021

(54) IN SITU H2S SCAVENGER ADDITIVE GENERATION

(71) Applicant: Halliburton Energy Services, Inc., Houston, TX (US)

(72) Inventors: William Cecil Pearl, Spring, TX (US); Megan Renee Pearl, Spring, TX (US); Samuel Jason Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/704,551

(22) Filed: Dec. 5, 2019

(51) Int. Cl.
| | |
|---|---|
| *E21B 43/26* | (2006.01) |
| *C09K 8/68* | (2006.01) |
| *C09K 8/54* | (2006.01) |
| *C09K 8/60* | (2006.01) |
| *C09K 8/52* | (2006.01) |
| *E21B 37/00* | (2006.01) |
| *C09K 8/74* | (2006.01) |

(52) U.S. Cl.
CPC ............... *C09K 8/68* (2013.01); *C09K 8/52* (2013.01); *C09K 8/54* (2013.01); *C09K 8/605* (2013.01); *C09K 8/74* (2013.01); *E21B 37/00* (2013.01); *E21B 43/26* (2013.01); *C09K 2208/20* (2013.01); *C09K 2208/26* (2013.01); *C09K 2208/28* (2013.01)

(58) Field of Classification Search
CPC ... C09K 8/68; C09K 8/52; C09K 8/54; C09K 8/605; C09K 2208/20; C09K 2208/26; C09K 2208/28; E21B 37/00; E21B 43/26
See application file for complete search history.

(56) References Cited

U.S. PATENT DOCUMENTS

| | | | |
|---|---|---|---|
| 4,680,127 A | 7/1987 | Edmondson | |
| 8,685,900 B2 * | 4/2014 | Ezell | C09K 8/512 507/117 |
| 8,728,990 B2 * | 5/2014 | Dino | C09K 8/64 507/238 |
| 8,772,205 B2 * | 7/2014 | Bismarck | C09K 8/035 507/219 |

(Continued)

OTHER PUBLICATIONS

Joseph E. Penkala et a., Acrolein 2-Propenal: A Versatile Microbiocide for Control of Bacteria in Oilfield Systems, Corrosion 2004, Baker Petrolite Corporation, NACE International, Paper No. 04749, pp. 1-24.

(Continued)

*Primary Examiner* — Silvana C Runyan
(74) *Attorney, Agent, or Firm* — Chamberlain Hrdlicka

(57) ABSTRACT

A composition includes a borehole or pipeline fluid and a delivery molecule, the delivery molecule stable under conditions external to a borehole or pipeline and including a precursor having an end terminating in degradable linkages bonding the precursor to bridged groups and another end terminating in a leaving group, where under in situ conditions in the pipeline or downhole from the borehole surface contact with an initiator acid catalyzes degradation of the degradable linkages and elimination of the leaving group, releasing the precursor and generating an additive from the precursor. A method includes placing the delivery molecule in the borehole or pipeline; and after the placing, contacting the composition with an initiator acid under in situ conditions.

20 Claims, 3 Drawing Sheets

(56) References Cited

U.S. PATENT DOCUMENTS

2007/0277981 A1    12/2007  Robb et al.
2012/0024529 A1*   2/2012   van Zanten .............. C09K 8/68
                                                         166/305.1

OTHER PUBLICATIONS

Kali A. Miller et al., Acid-Triggered, Acid-Generating, and Self-Amplifying Degradable polymers, Acid-Triggered, Acid-Generating, and Self-Amplifying Degradable Polymers, Jan. 30, 2019, 2838-2842, J. Am. Chem. Soc. 2019, 141, Journal of the American Chemical Society.

Kali A. Miller et al., Supporting Information Acid-Triggered, Acid-Generating, and Self-Amplifying Degradable polymers, University of Illinois at Urbana-Champaign, pp. S1-S29.

Richard P. Hsung (1990) An Improved Synthesis of 2-(β-Bromoethyl)-2-methyl-1,3-dioxolane, a Useful Methyl Vinyl Ketone Equivalent, Synthetic Communications, 20:8, 1175-1179, DOI: 10.1080/00397919008052825.

\* cited by examiner

IN SITU H2S SCAVENGER ADDITIVE GENERATION

BACKGROUND

This section is intended to provide relevant background information to facilitate a better understanding of the various aspects of the described embodiments. Accordingly, it should be understood that these statements are to be read in this light and not as admissions of prior art.

The present disclosure relates to systems and methods for extracting a produced material from a subterranean formation including additive generation in situ at a downhole location in a borehole or subterranean formation or in situ in a pipeline.

Operations to extract a subterranean product from the earth through a well often use borehole fluids to facilitate or implement the operations. Hydrocarbons, such as oil and gas, are subterranean products commonly extracted from reservoirs, areas of the earth that contain the hydrocarbons. A reservoir may be deep below the surface of the earth and the earth may include one or more formations that are above and/or make up the reservoir. A formation is a region of the earth with a distinct lithology describing the physical characteristics of the rock in the formation, such as mineral content. For example, a formation may include shale, a sedimentary rock which may include one or more materials that is reactive to water, such as by swelling upon contact with water.

Illustrative extraction operations may include, for example, drilling, completion, stimulation, and production. Stimulation operations may include, for example, fracturing and acidizing. In various of the operations, an additive is included in a borehole fluid used for the operation, where the borehole fluid is delivered downhole. For example, illustrative borehole fluids include fracturing fluids, cementing fluids, completion fluids, drilling mud, and production chemical fluids.

Acrolein is a borehole additive in the oil and gas industry due to its effectiveness as a $H_2S$ scavenger & biocide. Use of acrolein as a biocide is described for example in J. E. Penkala, et al. Acrolein, 2-Propenal: A Versatile Microbiocide for Control of Bacteria in Oilfield Systems, Paper No. 04749 in Corrosion 2004, NACE International. However, a disadvantage of acrolein is that it requires special handling and training of personnel. The HSE requirements for handling and training lead to increased prices and complicated logistics. Nevertheless, acrolein is typically provided ex situ at the surface of a borehole, necessitating implementation of the HSE requirements.

BRIEF DESCRIPTION OF THE DRAWINGS

Embodiments of the in situ additive generation are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
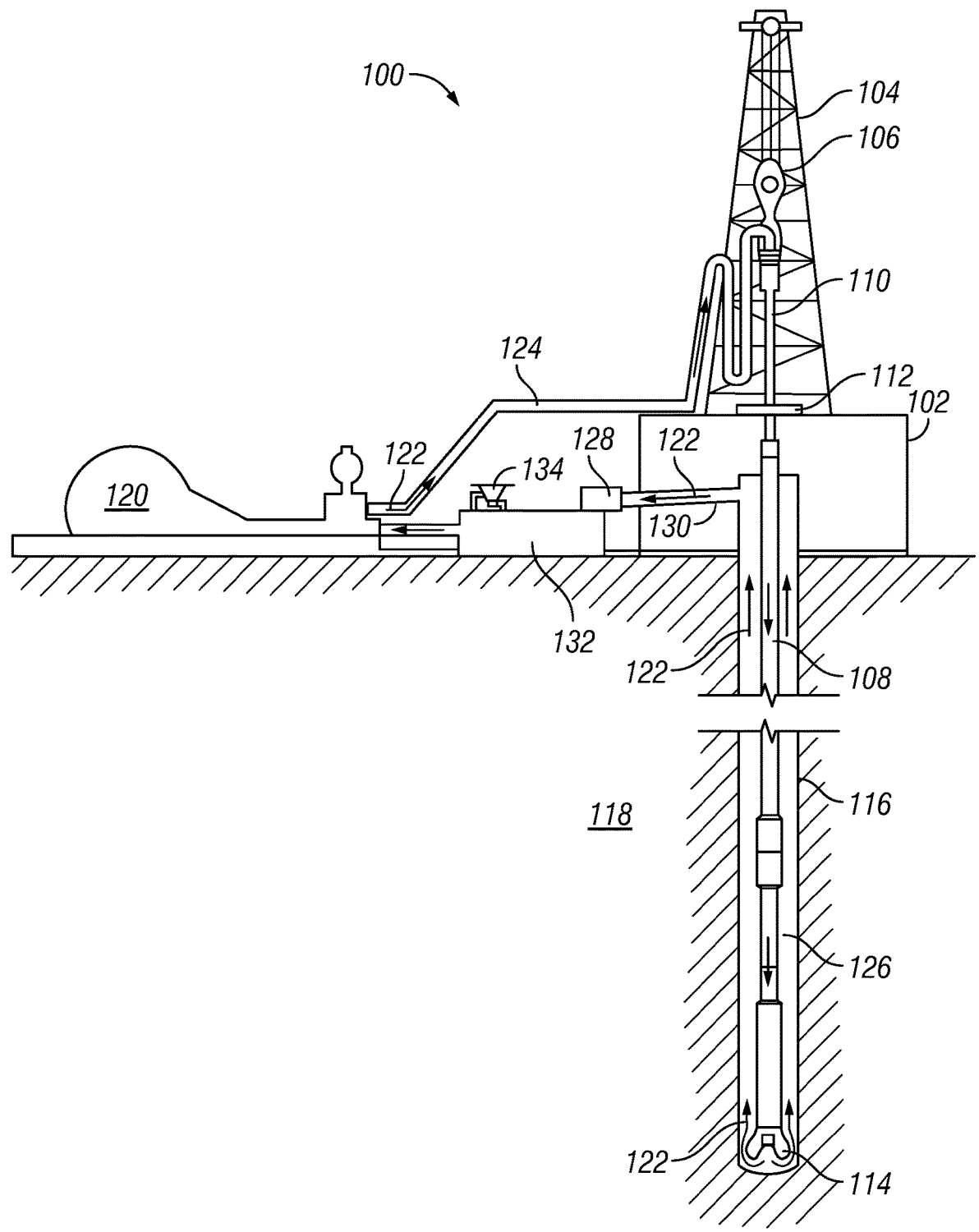
FIG. 1 is a diagram of an onshore well system, according to one or more embodiments.

The present disclosure provides a method of generating an additive in situ downhole. The present disclosure provides a borehole or pipeline fluid containing a delivery material that reacts with an initiator acid in situ to generate the additive. The additive may be a preservative for another additive. The delivery material includes delivery molecules having a precursor that contains an additive-generating group and a leaving group. The precursor is linked within the delivery molecule to bridged groups with degradable linkages. An initiator acid initiates the degradation of the degradable linkages, the elimination of the leaving group from the additive-generating group, and the transformation of the additive-generating group to the additive, thus generating the borehole additive from the delivery molecule. The reaction sequence that causes the release and transformation of the precursor is acid catalyzed. A less than stoichiometric amount of an initiator acid is capable to trigger autocatalytic degradation of the delivery molecule and release of the additive and product. The product may be a product acid.

The method and borehole or pipeline fluid have the benefit of generating the additive in situ. The method and borehole fluid also have the benefit of generating a product acid in situ simultaneously with the additive, with both derived from the same precursor. The in situ generation has the advantage to eliminate disadvantages of delivery of the additive externally when special handling is required. The delivery molecule has the advantage to be a multi-functional material with functionality associated to the additive and the leaving group. The leaving group may be an acid-generating group. The acid-generating group may be selected from halides, tosylates, mesylates, alcohols, nitrate, and phosphate (inorganic esters). The additive may be an aldehyde. For example, when the additive is acrolein or an acrolein derivative and the leaving group is an acid-generating group, the multi-functionality may be one or more of $H_2S$ scavenging, biocide treatment, borehole cleaning, acidizing, diverting, friction-reducing, self-degradable filter cake activity, completion permeability reduction (up to lost circulation control), and pH triggered transformation. Hydrohalic acids are examples of strong acids (where "strong" means pH up to 4) that requires special handling yet are useful for stimulating flow in a formation and/or for removing materials to clean a formation. When the additive is acrolein and the leaving group is a halide, generating the additive and product acid in situ have the advantage to avoid the special handling involved with delivery of acrolein and strong acids ex situ, that is externally to the borehole or pipeline.

The delivery molecule is a polymeric molecule, a non-polymeric small molecule, or other molecule for which the delivery molecule and/or the bridged groups are compatible and/or useful downhole. For example, the delivery molecule may be a polymeric molecule. When the delivery molecule is polymeric, the precursor may be incorporated in a cross-linker of the delivery molecule. For example, polyacrylamide may be used as a friction reducer. Alternatively, when the delivery molecule is polymeric, the precursor may be incorporated in a backbone of the delivery molecule. Alternatively, the delivery molecule may be a non-polymerized small molecule.

The precursor is present in the delivery molecule as a bridging group linked between bridged groups $U_1$ and $U_2$ in a section S of the delivery molecule $S=U_1$-P-$U_2$. $U_1$ and $U_2$ may have the same composition. Alternatively, $U_1$ and $U_2$ may have different compositions. When the delivery molecule is polymeric and the precursor is part of the backbone, the sections S may be monomers and the delivery molecule a polymer $D=(S)_n$. When the delivery molecule is polymeric and the precursor is part of crosslinker, the sections S may be crosslinkers, linking backbones $B_1$ and $B_2$ to form delivery molecule $D=B_1$-S-$B_2$. It will be understood that $B_1$ and $B_2$ may be the same backbone. Further, it will be understood that there may be multiple crosslinker sections S linking the same backbone or linking different backbones. When the delivery molecule is a non-polymeric small molecule, the section S may be the molecule $D=S$.

The precursor P contains a wellbore additive-generating group T bonded at one end to an acid-generating group An for a section $S=U_1(TAn)U_2$. The additive-generating group T contains linking groups L at the other end linking a hydrocarbyl $R_1$ to the bridged groups $U_1$ and $U_2$ for a borehole additive-generating group $T=R_1L_2$, a precursor $P=L-(R_1An)-L$ and a section $S=U_1-L-(R_1An)-L-U_2$. After or while the linkages -L- degrade to release the precursor, the precursor reacts to separate the acid-generating group from the wellbore additive-generating group and to transform the wellbore additive-generating group to the wellbore additive $R_2L$ and the acid-generating group to the product acid HAn.

The borehole additive is an aldehyde $R_4HCO$ or other wellbore additive $R_2L$ derivable from the additive-generating group $T=R_1L_2$ upon degradation of the linkages to $B_1$ and $B_2$ and upon release of the anion $An^-$, wherein $R_4$ and $R_2$ are respective hydrocarbyl groups. When the borehole additive is an aldehyde, $R_2$ is $R_4HC$ and L is O, the precursor P is O—$(HCR_3An)$—O, where $R_3$ is a hydrocarbyl group and $R_1$ is $HCR_3$. When L is O, the linkage —O— is termed herein an oxygen linkage and the linkages —O— together form an acetal linkage, creating a section $S=U_1$—O—$(HCR_3An)$-O—$U_2$. When U1 and U2 are the same R5, following Scheme 1 generally illustrates the formation of a section S:

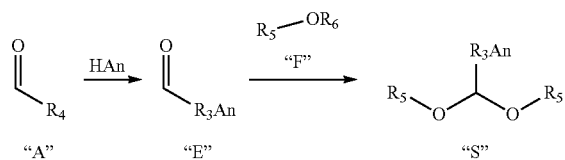

"A"    "E"    "S"

That is, the section S is formed by a condensation reaction between E, a reactant with the acid-generating group attached that is derived from the aldehyde A, and "F" a molecule that that can condense with the reactant F. "F" has an end group $OR_6$ that is capable of forming an orthoester when it condenses with an aldehyde. For example, the end group may be a hydroxyl or a protected hydroxyl. Thus $R_6$ is a hydrogen H or a condensation-allowing protecting group. For example, suitable molecules F include triethylene glycol monoethyl ether, vinyl alcohol, and a molecule having the structure:

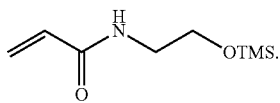

TMS is an example of a protecting group. The acid HAn used in the reaction scheme is the same as the product acid. The reactant E reacts with the condensing molecule F to generate the oxygen linkage. $R_5OR_6$ is a condensing moiety. $R_5$ is a hydrocarbyl or substituted hydrocarbyl. $R_5$ is selected according to the application. For example $R_5$ is selected according to whether the section S is used as a small molecule, as a crosslinker, or as a backbone monomer. $R_4$ is a hydrocarbyl or substituted hydrocarbyl. $R_4$ is selected to provide that the precursor P releases the desired additive upon degradation of the oxygen linkages. When $R_4$ is an ethenyl (also termed "vinyl") group, the wellbore additive is acrolein. When An is a halogen X and $R_4$ is an ethenyl group, $R_3$ is an ethyl group, $R_1$ is a propyl group, the additive-generating group T is propyl acetal, and the precursor P is 3-halopropyl acetal. When $R_4$ is a derivatized ethenyl (also termed "vinyl") group, the wellbore additive is a derivative of acrolein. When An is a halogen X and $R_4$ is a derivatized ethenyl group, $R_3$ is an ethyl group, $R_1$ is a propyl group, the additive-generating group T is a derivatized propyl acetal corresponding to the derivatized ethenyl group, and the precursor P is a derivatized 3-halopropyl acetal corresponding to the derivatized ethenyl group.

When the borehole additive is an aldehyde the degradation reaction is acid-catalyzed hydrolysis of the two —O-'s of the acetyl linkage to release $AnR_3HCO$. $AnR_3HCO$ then undergoes acid-catalyzed elimination to separate HAn and $R_4HCO$. Thus HAn and $R^4HCO$ are generated from the delivery molecule, where the delivery molecule is a small molecule $R_5$—O—$(HCR^3An)$-O—$R_5$, a small molecule $R_7$—O—$(HCR^3An)$-O—$R_7$, a polymer $(R_8$—O—$(HCR^3An)$-O—$R_8)_{11}$, or a polymer with precursor-containing crosslinker $B_1$—$(R_9$—O—$(HCR^3An)$-O—$R_9)$—$B_2$, wherein $R_7$ derives from $R_5$, for example by conversion of vinyl ends groups to alcohol end groups, where $R_8$ is the result of $R_5$ reacting to polymerize and $R_9$ is the result of $R_5$ reacting to crosslink. It will be understood that the polymer $(R_8$—O—$(HCR^3An)$-O—$R_8)_1$, may be further crosslinked with conventional crosslinkers that uncrosslinkable in acidic conditions. Similarly, it will be understood that the polymer crosslinked with precursor-containing crosslinker $B_1$—$(R_9$—O—$(HCR^3An)$-O—$R_9)$—$B_2$ may be further crosslinked with conventional crosslinkers that uncrosslinkable in acidic conditions. Acidic conditions indicates pH<7. In one or more embodiments, the aldehyde is acrolein or an acrolein derivative. Suitable acrolein derivatives include acrolein derivatives that can be formed by release of a leaving group An from a precursor P. Thus, suitable acrolein derivatives can be formed by release of a leaving group An from a section S.

The product acid is a hydrohalic acid HX, an organic acid, or other suitable acid including an anion $An^-$ that can be released by reaction of the precursor. Organic acids include acetic acid, formic acid, tartaric acid, lactic acid, sulfuric acid, nitric acid, and phosphoric acid. Hydrohalic acids include hydrofluoric acid, hydrochloric acid, hydroiodic acid, and hydrobromic acid. For example, the hydrohalic acid may be hydrochloric acid. When the product acid is hydrochloric acid, the anion is chloride, and the acid-generating group is chlorine bonded to the additive-generate group. When the additive is acrolein and the product acid is hydrochloric acid, the precursor is 3-chloropropyl acetal. Alternatively, the product acid is hydroiodic acid. When the product acid is hydroiodic acid, the anion is iodide, and the acid-generating group is iodine bonded to the additive-generating group. When the additive is acrolein and the product acid is hydroiodic acid, the precursor is 3-iodopropyl acetal. Still alternatively, the product acid is hydrofluoric acid. When the product acid is hydrofluoric acid, the anion is fluoride, and the acid-generating group is fluorine bonded to the additive-generating group. When the additive is acrolein and the product acid is hydrofluoric acid, the precursor is 3-fluropropyl acetal. When the product acid is acetic acid, the anion is acetate, and the acid-generating group is acetyl. When the additive is acrolein and the product acid is acetic acid, the precursor is 3-acetylpropyl acetal. When the product acid is formic acid, the anion is formate, and the acid-generating group is formyl. When the additive is acrolein and the product acid is formic acid, the precursor is 3-formylpropyl acetal.

In one or more embodiments, a composition may include a delivery molecule or a mixture of delivery molecules that produces multiple product acids, wherein the different product acids are produced from different sections. When the delivery molecule is polymeric, the different sections may be incorporated in different crosslinked polymer backbones. Alternatively, when the delivery molecule is polymeric the different sections may be incorporated as monomer sections in the same backbone of a copolymer.

When the delivery molecule is polymeric, each bridged group is independently one or more of a monomer, an oligomer, and a polymer. In one or more embodiments, each bridged group $U_1$ and $U_2$ independently includes one or more monomer based moieties derived from a water soluble monomer. For example, the monomer is an example of condensing molecule "F" that can react with the aldehyde based reactant "R" with the acid-generating group attached, to form an oxygen linkage. That is the monomer is a condensing monomer. Suitable condensing monomers include monomers having a terminal hydroxyl or protected hydroxyl group. The condensing monomer may be a condensing vinylic monomer. The condensing vinylic monomer may contain a vinylic group at an opposite end to the terminal hydroxyl or protected hydroxyl group. The vinylic group allows the section S that is formed to polymerize. Thus, the bridged group may be a condensing vinylic based moiety. The condensing vinylic based moieties may be an acrylic based moieties. The acrylic based moieties may be an acryalamide based moieties. For example, each bridged group $U^1$ and $U^2$ independently may include one or more monomer based moieties derived from a monomer selected from the group consisting of acrylamides, 2-acrylamido-2-methyl-1-propanesulfonic acid, N,N-dimethylacrylamide, 2-acrylamido-2-methylpropane sulfonic acid, N-vinylpyrollidone, acrylic acid, maleic anhydride, itaconic acid, vinyl acetate, and vinyl alcohol. The monomer based moieties may be part of different polymeric backbones. Alternatively, the monomer based moieties may be part of the same polymeric backbone. When the acrylamide based moieties are in the same or different backbones, the precursor may be a crosslinker crosslinking respective monomer based moieties. When the monomer based moieties are in the same backbone, the precursor may be incorporated into the backbone bonded between monomer based moieties.

In one or more embodiments, a composition containing the delivery molecule further includes a borehole or pipeline fluid. That is, in one or more embodiments, a borehole or pipeline fluid includes the delivery material where the delivery material includes a plurality of delivery molecules. The borehole or pipeline fluid may include from 0.1 to 50 weight ("wt.") % delivery material, for example from 0.5 to 30 wt. % delivery material, for example from 1 to 10 wt. % delivery material. The pipeline fluid is an extracted fluid transported by a pipeline. For example the pipeline fluid may be a hydrocarbon fluid. The borehole fluid is one or more of a stimulation fluid, a cementing fluid, a completion fluid, a drilling mud, a production chemical fluid, spacer fluid, and efficiency fluids. The stimulation fluid may be a fracturing fluid. When the borehole fluid is a stimulation fluid, the stimulation fluid has a composition for treating a formation, where the treating is one or more of $H_2S$ scavenging, biocide treatment, borehole cleaning, acidizing, diverting, friction reducing, and combinations thereof. When the borehole additive is acrolein, the acrolein provides functionality of one or more of $H_2S$ scavenging, biocide treatment. The product acid provides functionality of one or more of borehole cleaning and acidizing. When the delivery molecule is polymeric, the delivery molecule and/or the polymeric reaction product from releasing the additive and acid provides functionality of one or more of diverting, friction reducing, and mutual solvent activity. In one or more embodiments, the borehole or pipeline fluid is buffered. Buffers include pairs of buffering components. Suitable buffers pairs are sodium bicarbonate/formic acid, sodium carbonate/fumaric acid, sodium hydroxide/hydrochloric acid, monosodium phosphate/magnesium oxide. It will be understood that the buffer may be selected according to the one or more of a target pH and a type of borehole fluid.

When the delivery molecule is combined with a borehole or pipeline fluid, the delivery molecule and incorporation of the precursor into the delivery molecule will vary depending on the application. For example, polyacrylamide is useful as a friction reducing material. For example, a large polymer that is insoluble in aqueous solvent is useful as a diverter material. For example, poly(vinyl alcohol) is useful as a diverter material. For example, when the delivery molecule is combined with a borehole fluid for friction reducing or for diverter activity, in one or more embodiments, the precursor is a crosslinker and the bridged group is a polymeric moiety useful as a friction reducer or as a diverter. Alternatively, when the delivery molecule is combined with a borehole fluid for activity as a diverter or as a friction reducer, the precursor is part of the polymeric backbone of the delivery molecule and the bridged group is a polymeric moiety useful as a friction reducer or as a diverter. It will be understood that it is within the skill of one of ordinary skill in the art to choose between uncrosslinked and crosslinked polymers according to the circumstances of the application. For example, diverters are typically crosslinked and friction reducers can be crosslinked but are not required to be crosslinked. Further, a crosslinked polymer may include crosslinkers generating additive and/or conventional crosslinkers. Suitable conventional crosslinkers include metals, boron, and conventional polymeric crosslinkers. The borehole fluid may include a carrier fluid, the delivery material, and additional components where the additional components are conventional components selected for the application. The carrier fluid may be one or more of aqueous, oil-based, and combinations thereof such as an emulsion or an invert emulsion. When the carrier fluid is aqueous, the carrier fluid includes water. When the delivery molecule is combined with a pipeline fluid, in one or more embodiments, the composition containing the delivery molecule includes water. Alternatively or in combination, in one or more embodiments, the pipeline fluid includes water. In one or more embodiments, the water assists the reaction in situ, for example as a reactant in hydrolysis of acetal linkages in a delivery molecule.

Reaction to generate the wellbore additive and the product acid occurs in situ, for example downhole at borehole conditions, e.g., downhole temperature. The in situ conditions downhole include a temperature between 40° F. and 400° F., for example between 60° F. and 350° F., for example between 80° F. and 300° F. The in situ conditions downhole include a starting pH between 2 and 13, for example between 3 and 12, for example between 4 and 10. The reaction is induced downhole by adding an initiator acid and allowing the delivery material to heat up from the formation temperature. Suitable initiator acids include acetic acid, formic acid, tartaric acid, lactic acid, sulfuric acid, nitric acid, phosphoric acid, hydrochloric acid, hydroiodic acid, and combinations thereof. The initiator acid may be a weak acid, where a weak acid does not dissociate completely in solution, such as aqueous solution. It will be understood that the in situ conditions may depend on the application.

The rate of conversion from precursor to additive and anion may be adjusted according to the in situ conditions. When the in situ conditions are downhole, the in situ conditions may include downhole temperature, the starting pH, and the product acid. The temperature downhole is determined by the formation temperature. The starting pH of the conversion is determined by the initiator acid contacted with the delivery molecule downhole. Further, the starting pH is determined by the presence of any buffer added to the delivery molecule at the surface before placing the delivery molecule downhole. Further, the starting pH can be adjusted at ambient conditions in a blender or mixer at the surface without inducing degradation. The degradation is then induced when a delivery molecule is placed downhole and exposed to the initiator acid. The initiator acid may be combined with the delivery molecule downhole. Alternatively, for example when the rate of reaction is sufficiently slow at surface temperature, the initiator acid may be combined with the delivery molecule at the surface. In either alternative, the initiator acid and delivery molecule make contact at downhole conditions after placing the delivery molecule downhole. When the product acid is hydrochloric acid, the degradation and elimination reactions may proceed more slowly than when the product acid is hydroiodic acid because hydrochloric acid is less strong than hydroiodic acid. When the product acid is hydrochloric acid, the degradation and elimination reactions may proceed more quickly than when the product acid is hydrofluoric acid because hydrofluoric acid is stronger than hydrochloric acid. When the additive is acrolein, the delivery molecule may be placed in a borehole as a slow release biocide in neutral pH and an accelerated release biocide in lower pH than neutral.

The synthesis of the delivery molecule occurs ex situ to the borehole or pipeline, for example, at the surface of the earth. The synthesis occurs either at an external facility or at the site of the borehole or pipeline. Synthesis may proceed by known methods. The synthesis includes reaction of an additive-generating group supplying reactant with a leaving group supplying reactant to form an intermediate moiety, such as by known methods of addition of a halide. The synthesis further includes reaction of the intermediate with a bridged group supplying reactant with the intermediate moiety to form an intermediate section 5', such as by known methods of condensation to form acetal linkages. When the delivery molecule is a non-polymeric molecule, the delivery molecule, section, and intermediate section are the same, M=S=S'. When the delivery molecule is polymer incorporating the section in the backbone, S' is a monomer, and the synthesis further includes polymerization to form delivery molecule $M=(S)_n$. Alternatively, the delivery molecule is a copolymer incorporating blocks of one or more sections S with blocks of one or more polymerized co-monomer. When the delivery molecule is a polymer incorporating the section as a crosslinker, S' is a crosslinker intermediate, and the synthesis further includes reaction of the intermediate section S' with the backbone forming monomer and optionally backbone forming co-monomer to form delivery molecule $M=B^1—S—B^2$. The synthesis may include an optional reaction before formation of the polymer to exchange one leaving group for another.

In one or more embodiments, a delivery molecule is prepared off site from the borehole or pipeline for use in a method of delivering a borehole additive in situ in the borehole or pipeline, for example downhole in a borehole. Alternatively, the delivery molecule is prepared at the site of the borehole or pipeline, for example, at the surface. In one or more embodiments, the delivery material is combined with a buffer before placing the delivery material in the borehole or pipeline, for example, downhole. In one or more embodiments, the delivery material is provided at the site of the borehole or pipeline already combined with buffer. Alternatively, in one or more embodiments, the buffer is added to the delivery molecule as the delivery material is being placed in the borehole or pipeline, for example, as the delivery molecule is being pumped downhole. In one or more embodiments, a method of delivering a borehole additive into a borehole or pipeline includes combining the delivery molecule with a borehole or pipeline fluid. The combining may occur at onsite. The onsite combining may be on-the-fly mixing. Alternatively, the onsite combining may be batch mixing. Still alternatively, the combining may occur offsite. The combining may include adding a buffer to a borehole or pipeline fluid. The buffer may be added to the borehole or pipeline fluid onsite before placing the borehole or pipeline fluid in the borehole or pipeline. In one or more embodiment including adding, where one or more components are added together, the adding is mixing. In one or more embodiments, downhole is a location in a borehole. Alternatively or in combination, downhole is a location in a subterranean formation.

In one or more embodiments a system for delivering an additive to an in situ to a downhole location includes a fluid container, a tubular disposed in the borehole, in fluid communication with the fluid container, and including an end in proximity at a downhole location in the borehole; and a composition including a borehole fluid and a delivery molecule, the delivery molecule including a precursor having an end terminating in degradable linkages bonding the precursor to bridged groups and another end terminating in a leaving group, where the delivery molecule is stable under external conditions, wherein under in situ conditions contact with an initiator acid catalyzes degradation of the degradable linkages and elimination of the leaving group, thereby releasing the precursor from the delivery molecule and generating the wellbore treatment additive from the precursor, where the composition is dispensable from the fluid container and flowable through the tubular to the downhole location.

FIG. 1 is a diagram of an onshore well system 100 that includes a drilling platform 102 that supports a derrick 104 having a traveling block 106 for raising and lowering a drill string 108. The drill string 108 may include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118. The drill string 108 is illustrative of a tubular. One skilled in the art will appreciate that other configurations of a well system 100 may also be used.

A pump 120 (e.g., a mud pump) circulates borehole fluid 122 through a feed pipe 124 and to the kelly 110, which conveys the borehole fluid 122 downhole through the interior of the drill string 108 and through one or more orifices in the drill bit 114. The borehole fluid 122 is then circulated back to the surface via an annulus 126 defined between the drill string 108 and the walls of the borehole 116. At the surface, the recirculated or spent borehole fluid 122 exits the annulus 126 and is conveyed to one or more fluid processing unit(s) 128 via an interconnecting flow line 130. After passing through the fluid processing unit(s) 128, a "cleaned" borehole fluid 122 is deposited into a nearby retention pit 132. While illustrated as being arranged at the outlet of the borehole 116 via the annulus 126, those skilled in the art will readily appreciate that the fluid processing unit(s) 128 may be arranged at any other location in the well system 100 to facilitate its proper function, without departing from the scope of this disclosure.

The delivery material may be added to the borehole fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively or in combination, the disclosed delivery material may be added to the borehole fluid 122 at any other location in the well system 100. For example, there could be more than one retention pit 132, such as multiple retention pits 132 in series. Moreover, the retention pit 132 may be representative of one or more fluid storage facilities and/or units where the disclosed delivery material may be stored, reconditioned, and/or regulated until added to the borehole fluid 122. Retention pit 132 is illustrative of a container.

The fluid processing unit(s) 128 may include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the delivery material.

The pump 120 representatively includes any conduits, pipelines, trucks, tubulars, and/or pipes used to fluidically convey the borehole fluid downhole, any pumps, compressors, or motors (e.g., topside or downhole) used to drive the borehole fluid into motion, any valves or related joints used to regulate the pressure or flow rate of the borehole fluid, and any sensors (i.e., pressure, temperature, flow rate, etc.), gauges, and/or combinations thereof, and the like.

The drill bit 114 may include roller cone bits, PDC bits, natural diamond bits, any hole openers, reamers, coring bits, etc. There may be floats, drill collars, mud motors, downhole motors and/or pumps associated with the drill string 108. There may be MWD/LWD tools and related telemetry equipment, sensors or distributed sensors associated with the drill string 108. There may be downhole heat exchangers, valves and corresponding actuation devices, tool seals, packers and other borehole isolation devices or components, and the like associated with the borehole 116.

Figure 2:
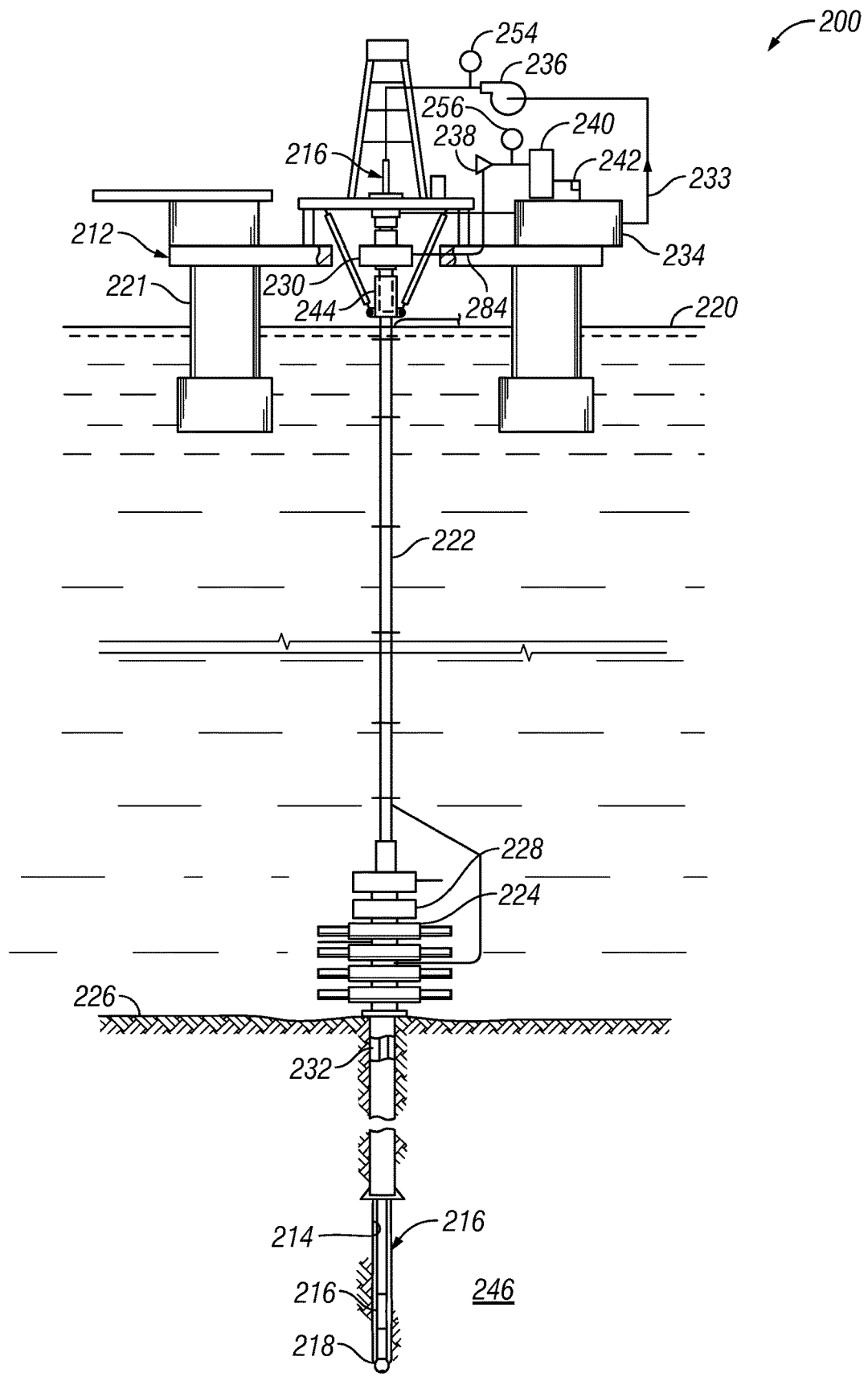
FIG. 2 is a diagram of an offshore well system, according to one or more embodiments.

FIG. 2 is a diagram of an offshore well system. Representatively illustrated in FIG. 2 is a system 200 for drilling a well, and an associated method, which system and method can embody principles of this disclosure. However, it should be clearly understood that the system 200 and method are merely one example of an application of the principles of this disclosure in practice, and a wide variety of other examples are possible. Therefore, the scope of this disclosure is not limited at all to the details of the system 200 and method described herein and/or depicted in the drawings.

In the well system 200 depicted in FIG. 2, a floating rig 212 including a floating vessel 221 is used to drill a borehole 214 in formation 246. A generally tubular drill string 216 has a drill bit 218 connected at a lower end thereof, and the drill bit is rotated and/or otherwise operated to drill the borehole 214. The floating vessel 221 is positioned at a surface location 220. The tubular drillstring 216 is illustrative of a tubular. One skilled in the art will appreciate that other configurations of a well system 200 may also be used.

In FIG. 2, a marine riser 222 extends between the rig 212 and a blowout preventer stack 224 positioned at a subsea location (e.g., at a mud line or on a seabed 226). The riser 222 serves as a conduit for guiding the drill string 216 between the rig 212 and the blowout preventer stack 224, for flowing fluids between the rig and the borehole 214, etc. The floating vessel 221 is connected to the marine riser 222 via a telescoping joint 244 (also known as a sliding joint or a slip joint), in order to accommodate vertical motion of the vessel 221 due to wave and tide influence.

Interconnected between the riser 222 and the blowout preventer stack 224 is an annular blowout preventer 228. The annular blowout preventer 228 is designed to seal off an annulus 232 about the drill string 216 in certain situations (e.g., to prevent inadvertent release of fluids from the well in an emergency, etc.), although a typical annular blowout preventer can seal off the top of the blowout preventer stack 224 even if the drill string is not present in the annular blowout preventer. Near an upper end of the riser 222 is an annular sealing device 230, which is also designed to seal off the annulus 232 about the drill string 216.

Borehole fluid 233 is contained in a reservoir 234 of the rig 212. A rig pump 236 is used to pump the borehole fluid 233 into the drill string 216 at the surface. The borehole fluid flows through the drill string 216 and into the borehole 214 (e.g., exiting the drill string at the drill bit 218). The reservoir 234 is illustrative of a container and the drill string 216 is illustrative of a tubular.

The delivery material may be added to the borehole fluid 233 via reservoir 234 or another container, such as a mixing hopper (not shown) communicably coupled to or otherwise in fluid communication with the reservoir 234. The mixing hopper may include, but is not limited to, mixers and related mixing equipment known to those skilled in the art. Alternatively or in combination, the disclosed delivery material may be added to the borehole fluid 233 at any other location in the floating rig 212. For example, there could be more than one reservoir 234, such as multiple reservoirs 234 in series. Moreover, the reservoirs 234 may be representative of one or more fluid storage facilities and/or units where the disclosed delivery material may be stored, reconditioned, and/or regulated until added to the borehole fluid 233. Reservoir 234 is illustrative of a container.

The borehole fluid 233 then exits the drill bit 218 and flows through the annulus 232 back to the reservoir 234 via a choke manifold 238, a gas buster or "poor boy" degasser 240, a solids separator 242, etc. Measurements of flow rate into the well and flow rate from the well could be obtained, for example, by use of flowmeters 254, 256. However, it should be understood that other types and combinations of borehole fluid handling, conditioning and processing equipment may be used within the scope of this disclosure.

A pressure control system (not shown) can be used to control pressure in the borehole 214. The pressure control system can operate the choke manifold 238, so that a desired amount of backpressure is applied to the annulus 232. The pressure control system may regulate operation of other equipment (e.g., the pump 236, a standpipe control valve, a diverter which diverts flow from the pump 236 to a borehole fluid return line 284 upstream of the choke manifold 238, etc.), as well.

Figure 3:
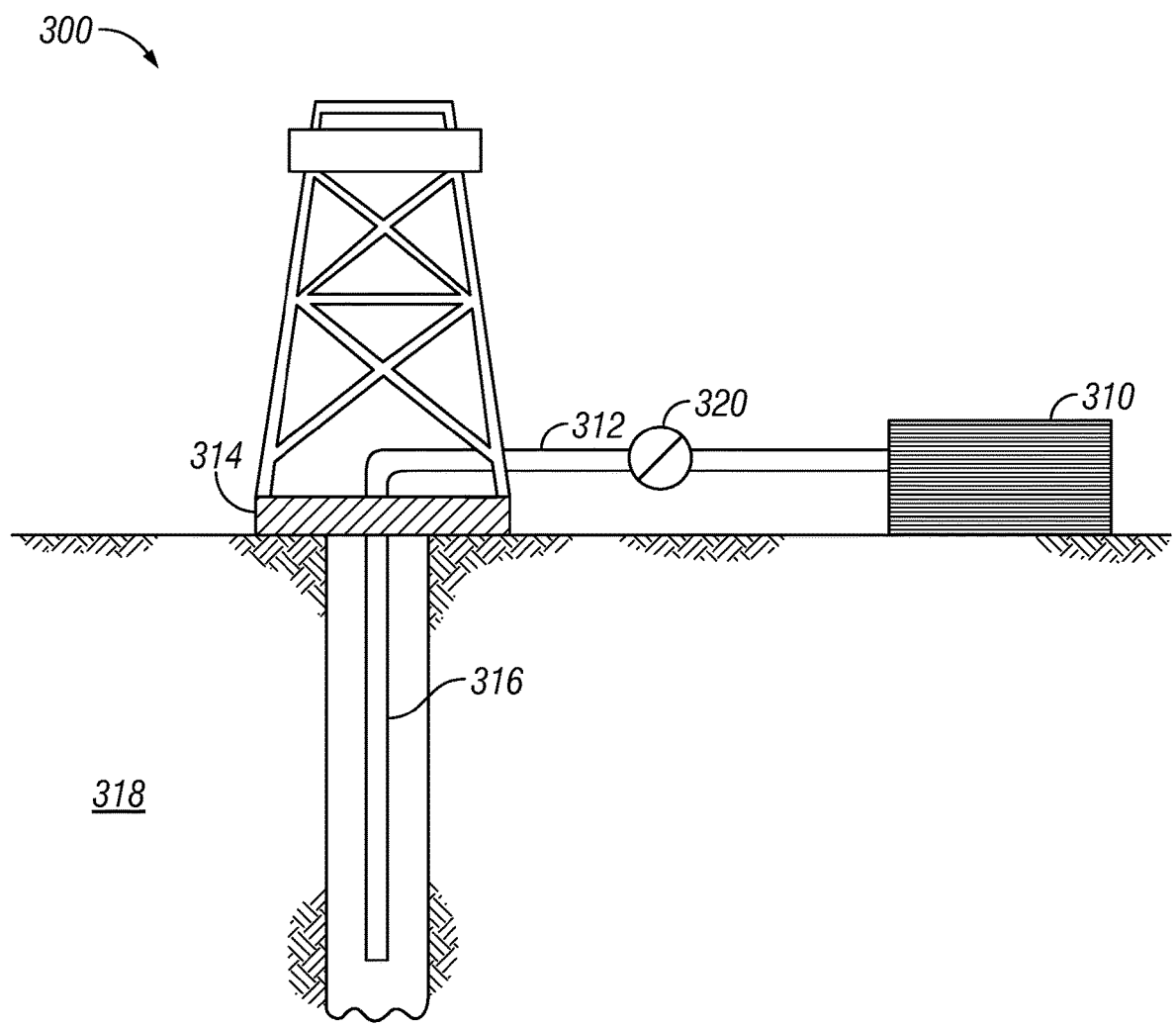
FIG. 3 illustrates a system for delivering a composition in a borehole or a subterranean formation, according to one or more embodiments.

FIG. 3 shows an illustrative schematic of a system that can deliver a composition including the delivery material in a borehole or a subterranean formation, according to one or more embodiments. It should be noted that while FIG. 3 generally depicts a land-based system or apparatus, it is to be recognized that like systems and apparatuses can be operated in subsea locations as well. Embodiments of the present disclosure can have a different scale than that depicted in FIG. 3. As depicted in FIG. 3, system or apparatus 3 can include mixing tank 310, in which an embodiment of the composition can be formulated. The composition can be conveyed via line 312 to wellhead 314, where the composition enters tubular 316, with tubular 316 extending from wellhead 314 into subterranean formation 318. Upon being ejected from tubular 316, the composition can subsequently penetrate into subterranean formation 318. Pump 320 can be configured to raise the pressure of the composition to a desired degree before its introduction into tubular 316. It is to be recognized that system or apparatus 3 is merely exemplary in nature and various additional components can be present that have not necessarily been depicted in FIG. 3 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 3, at least part of the composition can, in some embodiments, flow back to wellhead 314 and exit subterranean formation 318. The composition that flows back can be substantially diminished in the concentration of the delivery material therein. In some embodiments, the composition that has flowed back to wellhead 314 can subsequently be recovered, and in some examples reformulated, and recirculated to subterranean formation 318.

In one or more embodiments, for example, a composition includes a hydrogel of delivery molecules including polyacrylamide polymer backbones crosslinked by acrylamide-3-chloropropyl acetal-acrylamide precursors that release to generate acrolein and hydrochloric acid. That is, in this example, $U^1$ and $U^2$ are polyacrylamide. The hydrogel may include a plurality of crosslinked backbones. In this example, the additive generating group T is propyl, and the leaving group An is I. L is oxygen O, $B^1$ and $B^2$ are acrylamide moieties. One acrylamide moiety is CONHCH2CH2, where the carbon of the terminal CH2 is bonded to an oxygen O, and the carbon of the carbonyl CO is bonded to polyacrylamide $U^1$. The other acrylamide moiety is CH2CH2NHCO, where the carbon of the terminal CH2 is bonded to an oxygen O, and the carbon of the carbonyl CO is bonded to polyacrylamide $U^2$. A synthesis scheme, Scheme 2, is as follows:

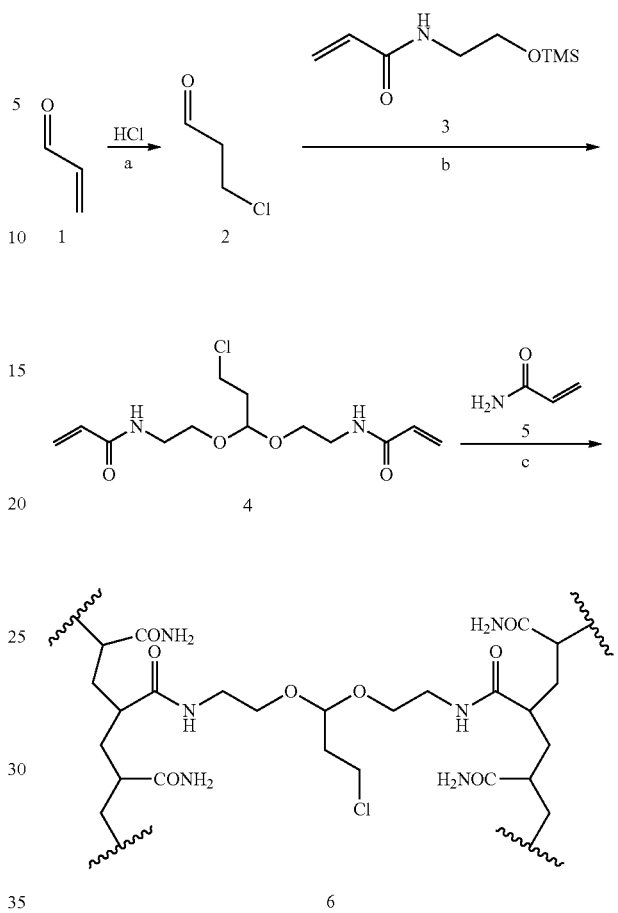

Reaction conditions "a" include diethyl ether solvent and room temperature (20-25° C., e.g. 23° C.). Reaction conditions "b" include the presence of trimethylsilyl trifluoromethane sulfonate, dichloromethane solvent and a temperature of −40° C. Reaction conditions "c" include the presence of water, a solvent of 2,2-diethoxyacetophenone (DEAP) dissolved in dimethyl sulfoxide (DMSO), room temperature (20-25° C., e.g. 23° C.), and exposure to a mercury ultraviolet lamp. Molecule 2 illustrate a reactant based on the aldehyde that is a reactant with the leaving group attached. Molecule 3 illustrates a molecule that can react with a reactant based on the aldehyde to form an oxygen linkage.

The delivery molecule 6 is delivered to the site of an onshore borehole in an aqueous solution. The aqueous solution is mixed on-the-fly into a fracturing fluid at the site of the onshore borehole and placed downhole. Acetic acid as the initiator acid is contacted with the fracturing fluid downhole. The formic acid may be placed in the borehole with, before, or after the fracturing fluid. When the formic acid is placed with the fracturing fluid, it may be provided in a delayed release form that is released upon exposure to the temperature downhole. The starting pH is 7. The reaction temperature is 90° C. The reaction to release acrolein and hydrochloric acid proceeds within several hours, for example within several minutes. Upon release of acrolein and hydrochloric acid, the remaining polyacrylamide has use as a friction reducer. The acrolein acts as a hydrogen sulfide scavenger and biocide. The hydrochloric acid acts as an acidizer. An in situ reaction scheme, Scheme 3, is as follows:

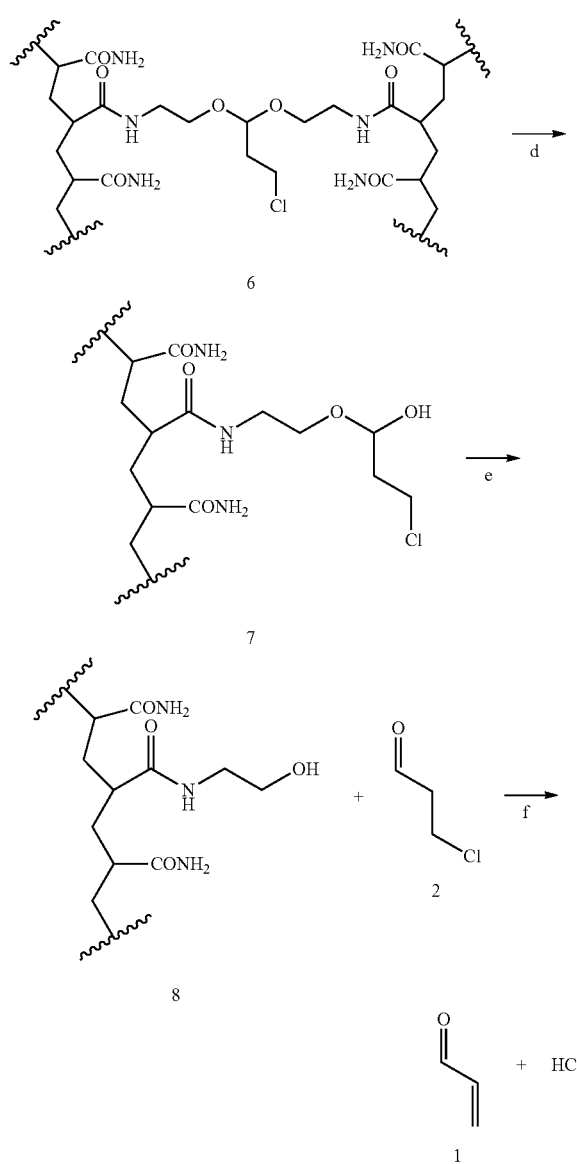

Each of the reaction conditions "d", "e", "f" include the in situ conditions downhole. The in situ conditions include aqueous carrier fluid, acetic acid, the temperature of 90° C., and the pH which starts at 7 and decreases as the reaction to degrade the acetal linkages to form intermediate 7 ("d") and intermediate 8 ("e") and to release acrolein and hydrochloric acid (HCl) from intermediate 8 ("f") proceeds. After initiation of degradation of the acetal linkages in a molecule 6, with the acetic acid, the produced HCl feeds back to react with further molecules 6. Thus, the reaction is self-amplifying.

One or more specific embodiments of the in-situ additive generation have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "include" means include, but is not limited to. Likewise, reference through this specification to "includes" means includes, but is not limited to.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

Unless otherwise indicated, a numerical parameter "n" expressing quantities used in the present disclosure and associated claims means "about n". Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

SPECIFIC EMBODIMENTS

A method of generating an additive in situ in a borehole or subterranean formation or pipeline may include placing a delivery molecule in the borehole or subterranean formation or pipeline, the delivery molecule comprising a precursor having an end terminating in degradable linkages bonding the precursor to bridged groups and another end terminating in a leaving group, wherein the delivery molecule is stable under external conditions; and contacting the delivery molecule in situ with an initiator acid, wherein the initiator acid catalyzes degradation of the degradable linkages and elimination of the leaving group, thereby releasing the precursor from the delivery molecule and generating the additive from the precursor.

The method may include the embodiments of any preceding paragraph or combination thereof and further include wherein the additive is an aldehyde and the degradable linkages form an acetal linkage.

The method may include the embodiments of any preceding paragraph or combination thereof and further include wherein the aldehyde is acrolein or an acrolein derivative.

The method may include the embodiments of any preceding paragraphs or combination thereof and further include wherein the leaving group comprises an acid-generating group and the method further comprises generating a product acid from the acid-generating group.

The method may include the embodiments of any preceding paragraph or combination thereof and further include wherein the product acid is selected from the group consisting of hydrohalic acids and organic acids.

The method may include the embodiments of any preceding paragraph or combination thereof and further include wherein the delivery molecule is polymeric.

The method may include the embodiments of any preceding paragraph or combination thereof and further include wherein precursor and bridged groups are incorporated in a crosslinker in the delivery molecule.

The method may include the embodiments of any preceding paragraph or combination thereof and further include wherein the precursor and bridged groups are incorporated in a backbone in the delivery molecule.

The method may include the embodiments of any preceding paragraph or combination thereof and further include wherein the bridged groups are selected from the group consisting of monomers, oligomers, polymers, and combinations thereof.

The method may include the embodiments of any preceding paragraph or combination thereof and further include wherein each bridged group independently comprises one or more condensing vinylic based moieties, each condensing vinylic based moiety selected from the group consisting of acrylamides, 2-acrylamido-2-methyl-1-propane sulfonic acid, N,N-dimethylacrylamide, 2-acrylamido-2-methylpropane sulfonic acid, N-vinylpyrollidone, acrylic acid, maleic anhydride, itaconic acid, vinyl acetate, vinyl alcohol, and combinations thereof.

The method may include the embodiments of any preceding paragraph or combination thereof and further include wherein the delivery molecule is a non-polymeric molecule.

The method may include the embodiments of any preceding paragraph or combination thereof and further include further comprising adjusting a rate of release of the precursor.

The method may include the embodiments of any preceding paragraph or combination thereof and further include wherein the adjusting the rate of release of the precursor comprises determining one or more of an in situ temperature, a strength of the initiator acid, and a composition of a buffer in which the delivery molecule is provided.

The method may include the embodiments of any preceding paragraph or combination thereof and further include wherein the initiator acid is in aqueous solution during the contacting.

The method may include the embodiments of any preceding paragraph or combination thereof and further include wherein the placing comprises combining the delivery molecule with a borehole or pipeline fluid.

The method may include the embodiments of any preceding paragraph or combination thereof and further include wherein the borehole or pipeline fluid comprises water.

The method may include the embodiments of any preceding paragraph or combination thereof and further include wherein the borehole or pipeline fluid is a fracturing fluid, wherein the method comprises treating the one or more of the borehole and a subterranean formation, wherein the treating is selected from the group consisting of $H_2S$ scavenging, biocide treatment, borehole cleaning, acidizing, diverting, friction reducing, and combinations thereof.

For example, a method of generating an additive in situ in a borehole or subterranean formation or pipeline may include placing a delivery molecule in the borehole or subterranean formation or pipeline, the delivery molecule comprising a precursor having an end terminating in degradable linkages bonding the precursor to bridged groups and another end terminating in a leaving group, wherein the delivery molecule is stable under external conditions; and contacting the delivery molecule in situ with an initiator acid, wherein the initiator acid catalyzes degradation of the degradable linkages and elimination of the leaving group, thereby releasing the precursor from the delivery molecule and generating the additive from the precursor, wherein the method further comprises generating a product acid from the acid-generating group, the placing comprises combining the delivery molecule with a fracturing fluid, the additive is acrolein, the leaving group comprises an acid-generating group, the product acid is hydrohalic acid, and the each bridged group independently comprises one or more condensing vinylic based moieties.

A composition for generating a borehole additive in situ in a borehole or subterranean formation or pipeline may include a borehole or pipeline fluid and a delivery molecule comprising a precursor having an end terminating in degradable linkages bonding the precursor to bridged groups and another end terminating in a leaving group, wherein the delivery molecule is stable under external conditions, wherein under in situ conditions contact with an initiator acid catalyzes degradation of the degradable linkages and elimination of the leaving group, thereby releasing the precursor from the delivery molecule and generating the borehole or pipeline additive from the precursor.

The composition may include the embodiments of any preceding paragraph or combination thereof and further include wherein the additive is an aldehyde and the degradable linkages form an acetal linkage.

The composition may include the embodiments of any preceding paragraph or combination thereof and further include wherein the aldehyde is acrolein or an acrolein derivative.

The composition may include the embodiments of any preceding paragraphs or combination thereof and further include wherein the leaving group comprises an acid-generating group and the method further comprises generating a product acid from the acid-generating group.

The composition may include the embodiments of any preceding paragraph or combination thereof and further include wherein the product acid is selected from the group consisting of hydrohalic acids and organic acids.

The composition may include the embodiments of any preceding paragraph or combination thereof and further include wherein the delivery molecule is polymeric.

The composition may include the embodiments of any preceding paragraph or combination thereof and further include wherein precursor and bridged groups are incorporated in a crosslinker in the delivery molecule.

The composition may include the embodiments of any preceding paragraph or combination thereof and further include wherein the precursor and bridged groups are incorporated in a backbone in the delivery molecule.

The composition may include the embodiments of any preceding paragraph or combination thereof and further include wherein the bridged groups are selected from the group consisting of monomers, oligomers, polymers, and combinations thereof.

The composition may include the embodiments of any preceding paragraph or combination thereof and further include wherein each bridged group independently comprises one or more condensing vinylic based moieties, each condensing vinylic based moiety selected from the group consisting of acrylamides, 2-acrylamido-2-methyl-1-propane sulfonic acid, N,N-dimethylacrylamide, 2-acrylamido-2-methylpropane sulfonic acid, N-vinylpyrollidone, acrylic acid, maleic anhydride, itaconic acid, vinyl acetate, vinyl alcohol, and combinations thereof.

The composition may include the embodiments of any preceding paragraph or combination thereof and further include wherein the delivery molecule is a non-polymeric molecule.

For example, a composition for generating a borehole additive in situ in a borehole or subterranean formation or pipeline may include a borehole or pipeline fluid and a delivery molecule comprising a precursor having an end terminating in degradable linkages bonding the precursor to bridged groups and another end terminating in a leaving group, wherein the delivery molecule is stable under external conditions, wherein under in situ conditions contact with an initiator acid catalyzes degradation of the degradable linkages and elimination of the leaving group, thereby releasing the precursor from the delivery molecule and generating the borehole or pipeline additive from the precursor, wherein the additive is acrolein, the leaving group comprises an acid-generating group, the product acid is hydrohalic acid, and the each bridged group independently comprises one or more condensing vinylic based moieties.

What is claimed is:

1. A method of generating an additive in situ in a borehole or subterranean formation or pipeline and scavenging hydrogen sulfide with the additive, the method comprising:
    placing a delivery molecule in the borehole or subterranean formation or pipeline, the delivery molecule comprising a precursor having an end terminating in degradable linkages bonding the precursor to bridged groups and another end terminating in a leaving group, wherein the delivery molecule is stable under external conditions;
    contacting the delivery molecule in situ with an initiator acid, wherein the initiator acid catalyzes degradation of the degradable linkages and elimination of the leaving group, thereby releasing the precursor from the delivery molecule and auto-catalytically generating a strong acid and the additive from the precursor, wherein the additive is furthermore suitable for biocide treatment and the strong acid is suitable for borehole cleaning; and
    scavenging hydrogen sulfide from the borehole or subterranean formation or pipeline with the additive.

2. The method according to claim 1, wherein the additive is an aldehyde and the degradable linkages form an acetal linkage.

3. The method of claim 2, wherein the aldehyde is acrolein or an acrolein derivative.

4. The method of claim 1, wherein the leaving group comprises an acid-generating group and the method further comprises generating a product acid from the acid-generating group.

5. The method of claim 4, wherein the product acid is selected from the group consisting of hydrohalic acids and organic acids.

6. The method of claim 1, wherein the delivery molecule is polymeric.

7. The method of claim 6, wherein precursor and bridged groups are incorporated in a crosslinker in the delivery molecule.

8. The method of claim 6, wherein the precursor and bridged groups are incorporated in a backbone in the delivery molecule.

9. The method of claim 6, wherein the bridged groups are selected from the group consisting of monomers, oligomers, polymers, and combinations thereof.

10. The method of claim 9, wherein each bridged group independently comprises one or more condensing vinylic based moieties, each condensing vinylic based moiety selected from the group consisting of acrylamides, 2-acrylamido-2-methyl-1-propanesulfonic acid, N,N-dimethylacrylamide, 2-acrylamido-2-methylpropane sulfonic acid, N-vinylpyrollidone, acrylic acid, maleic anhydride, itaconic acid, vinyl acetate, vinyl alcohol, and combinations thereof.

11. The method of claim 1, wherein the delivery molecule is a non-polymeric molecule.

12. The method of claim 1, further comprising adjusting a rate of release of the precursor.

13. The method of claim 12, wherein the adjusting the rate of release of the precursor comprises determining one or more of an in situ temperature, a strength of the initiator acid, and a composition of a buffer in which the delivery molecule is provided.

14. The method of claim 1, wherein the initiator acid is in aqueous solution during the contacting.

15. The method of claim 1, wherein the placing comprises combining the delivery molecule with a borehole fluid or pipeline fluid.

16. The method of claim 15, wherein the borehole fluid or pipeline fluid comprises water.

17. The method of claim 15, wherein the borehole fluid or pipeline fluid is a fracturing fluid, wherein the method comprises treating the one or more of the borehole and a subterranean formation, wherein the treating is selected from the group consisting of $H_2S$ scavenging, biocide treatment, borehole cleaning, acidizing, diverting, friction reducing, and combinations thereof.

18. The method of claim 1, wherein the placing comprises combining the delivery molecule with a fracturing fluid, the additive is acrolein, the leaving group comprises an acid-generating group, the strong acid is hydrohalic acid, and the bridged groups comprise one or more condensing vinylic based moieties.

19. A composition for generating an additive in situ in a borehole or subterranean formation or pipeline and scavenging hydrogen sulfide with the additive, the composition comprising:
- a borehole fluid or pipeline fluid; and
- a delivery molecule comprising a precursor having an end terminating in degradable linkages bonding the precursor to bridged groups and another end terminating in a leaving group, wherein:
  - the delivery molecule is stable under external conditions;
  - under in situ conditions, contact with an initiator acid catalyzes degradation of the degradable linkages and elimination of the leaving group, thereby releasing the precursor from the delivery molecule and autocatalytically generating a strong acid and the additive from the precursor;
  - the additive is suitable for scavenging hydrogen sulfide from the borehole or subterranean formation or pipeline; and
  - the additive is furthermore suitable for biocide treatment and the strong acid is suitable for borehole cleaning.

20. The composition according to claim 19, wherein the additive is acrolein or an acrolein derivative and the leaving group comprises an acid-generating group.

* * * * *